(12) United States Patent
Bertini

(10) Patent No.: US 7,976,747 B2
(45) Date of Patent: Jul. 12, 2011

(54) METHOD FOR RESTORING POWER CABLES

(75) Inventor: Glen J. Bertini, Tacoma, WA (US)

(73) Assignee: Novinium, Inc., Federal Way, WA (US)

( * ) Notice: Subject to any disclaimer, the term of this patent is extended or adjusted under 35 U.S.C. 154(b) by 516 days.

(21) Appl. No.: 12/257,993

(22) Filed: Oct. 24, 2008

(65) Prior Publication Data

US 2009/0133799 A1    May 28, 2009

Related U.S. Application Data

(60) Provisional application No. 60/990,586, filed on Nov. 27, 2007.

(51) Int. Cl.
*B29C 73/00* (2006.01)
(52) U.S. Cl. .................. 264/36.19; 174/25 C; 174/25 P
(58) Field of Classification Search ............... 264/36.19; 174/25 C, 25 P
See application file for complete search history.

(56) References Cited

U.S. PATENT DOCUMENTS

| | | | |
|---|---|---|---|
| 4,372,988 A | 2/1983 | Bahder | |
| 4,545,133 A | 10/1985 | Fryszczyn et al. | |
| 4,766,011 A | 8/1988 | Vincent et al. | |
| 4,845,309 A | 7/1989 | Vincent et al. | |
| 4,945,653 A | 8/1990 | Eager, Jr. et al. | |
| 4,961,961 A | 10/1990 | Vincent et al. | |
| 4,978,694 A | 12/1990 | Vincent et al. | |
| 5,372,840 A | 12/1994 | Kleyer et al. | |
| 5,372,841 A * | 12/1994 | Kleyer et al. | 427/117 |
| 5,907,128 A | 5/1999 | Lanan et al. | |
| 6,162,491 A | 12/2000 | Bertini | |
| 6,697,712 B1 | 2/2004 | Bertini et al. | |
| 7,195,504 B2 | 3/2007 | Bertini et al. | |
| 2005/0189130 A1 | 9/2005 | Bertini et al. | |
| 2005/0192708 A1 | 9/2005 | Bertini | |
| 2007/0046668 A1 | 3/2007 | Bertini | |
| 2007/0169954 A1 | 7/2007 | Bertini et al. | |
| 2008/0173467 A1 | 7/2008 | Bertini et al. | |
| 2008/0223498 A1 | 9/2008 | Bertini et al. | |

OTHER PUBLICATIONS

Transmission & Distribution World, Jul. 1, 1999, "Submarine Cable Rescued With Silicone-Based Fluid."
Kim Jenkins, UTILX Corp., Submarine Cable Rescued With Silicone-Based Fluid; Slide Presentation; USA; 18 pgs.
Glen J. Bertini, Entergy Metro Case Study: Post-Treatment Lessons; ICC Meeting; Apr. 1997; Scottsdale, Arizona; USA.

(Continued)

*Primary Examiner* — Christina Johnson
*Assistant Examiner* — Galen Hauth
(74) *Attorney, Agent, or Firm* — Davis Wright Tremaine LLP; George C. Rondeau, Jr.

(57) ABSTRACT

A method for extending the useful life of an in-service electrical cable section having a stranded conductor surrounded by a conductor shield encased in a polymeric insulation jacket and having an interstitial void volume in the region of the conductor, the cable section having an average conductor temperature T. The method comprising (i) continuously introducing a non-condensing exclusion fluid into the interstitial volume, the exclusion fluid comprising at least one non-condensing exclusion component having a solubility in the insulation polymer at least 100 times the corresponding solubility of water, each solubility being determined at temperature T; and (ii) injecting a condensing dielectric enhancement fluid into the interstitial void volume, wherein the dielectric enhancement fluid has a virtual flow rate within the interstitial void volume of less than about 0.1 liter per hour.

31 Claims, 6 Drawing Sheets

OTHER PUBLICATIONS

"Injection Supersaturation," Minutes of the 104th Meeting of the IEEE, PES, ICC, Oct. 26, 1998, Appendix A (5-30)-1.

Katz, C. et al., "Extending the service life of ethylene propylene rubber insulated cables," Power Engineering Society Winter Meeting 2000, IEEE, vol. 1, Issue 2000, pp. 730-735, Digital Object Identifier 10.1109/PESW.2000.850154.

Bertini, Glen J., "Recent Advancements in Cable Rejuvenation Technology," presentation at IEEE/PES 1999 Summer Meeting, Reliability Centered Maintenance, Jul. 21, 1999.

Bertini et al., "Silicone Strand-Fill: A New Material and Process," Spring 1990 Insulated Conductors Committee (ICC) of the Power Engineering Society (PES) of the Institute of Electrical and Electronic Engineers (IEEE), Dearborn, MI.

Kleyer and Chatterton, "The Importance of Diffusion and Water Scavenging in Dielectric Enhancement of Aged Medium Voltage Underground Cables," Proceedings of the IEEE/PES Conference, Apr. 1994.

McKean, "Breakdown mechanism studies in crosslinked polyethylene (XLPE) Cable," IEEE Transactions on Power Apparatus and System, vol. PAS-95, No. 1, Jan./Feb. 1976, pp. 253-260.

Hudson and Crucitt, "SRP Enhances Reliability of Underground Distribution Cable," Transmission & Distribution World, Aug. 1, 2004 (http://tdworld.com/mag/power_srp_enhances_reliability/).

Bertini and Vincent, "Cable Rejuvenation Mechanisms," IEEE, PES, ICC SubA, Mar. 14, 2006.

Bertini, "Enhancing the Reliability of Solid-dielectric Cables," Nov. 2001, Australia D2001 conference and exposition.

Bertini, "New Developments in Solid Dielectric Life Extension Technology," IEEE, ISEI, Sep. 2004.

Bertini, "Molecular Thermodynamics of Water in Direct-Buried Power Cables," Electrical Insulation Magazine, Nov./Dec. 2006.

Bertini, "Advances in Chemical Rejuvenation of Submarine Cables," Jicable '07, 7th International Conference on Insulated Power Cables, pp. 265-269.

Tarampi, "BC Hydro Cable Rejuvenation Program," IEEE PES ICC C30D, Oct. 27, 2008.

\* cited by examiner

METHOD FOR RESTORING POWER CABLES

This application is a continuation application of U.S. Provisional Application No. 60/990,586 filed Nov. 27, 2007.

BACKGROUND OF THE INVENTION

1. Field of the Invention

The present invention relates to a method for extending the longevity of an electrical power cable. More particularly, the invention relates to an improved method for restoring the dielectric properties of a very long or obstructed in-service electrical power cable section wherein a dielectric enhancement fluid is injected into the interstitial void volume of the cable.

2. Description of the Related Art

In a well known method for restoring the dielectric properties of an in-service electrical power cable, a liquid composition comprising at least one organoalkoxysilane is introduced (injected) into the interstitial void volume associated with the geometry of the stranded conductor of the cable. Over an extended period, the organoalkoxysilane diffuses radially through the polymeric insulation jacket of the cable and fills microscopic defects (trees) therein. Ideally, the organoalkoxysilane hydrolyzes in the presence of adventitious water, which diffuses in from the environment, and subsequently condenses within these defects, thereby augmenting the old cable's dielectric performance. These reactions are facilitated by a catalyst included in the composition. This, in turn, results in the formation of oligomeric siloxane species which are not subject to eventual loss due to continued diffusion, and the above commercially practiced method thus offers a distinct advantage over the use of non-condensable fluids (e.g., see U.S. Pat. No. 4,766,011). Unfortunately, as desirable as the oligomerization of organoalkoxysilanes within the insulation jacket is, its condensation within the strand interstices results in increased viscosity and reduced flow rate of the treatment fluid. As a practical matter, flow can even stall entirely if this viscosity becomes too high.

Prior to the advent of the above method, strand desiccation methods were employed in an effort to restore the dielectric strength of old power cables. In this case, a dry fluid such as air, nitrogen, an alcohol or a glycol is injected into the interstitial void volume to remove water therefrom (e.g., see U.S. Pat. Nos. 4,372,988 and 4,545,133). Such a drying step has also been utilized just prior to injecting the organoalkoxysilane in the above described method to prevent premature condensation of the organoalkoxysilane due to reaction with water initially present in the interstitial void volume. But even a combination of these steps (i.e., first drying, then injecting with organoalkoxysilane) cannot guarantee that premature condensation will not occur in the interstitial volume when the organoalkoxysilane injection step takes a very long time since water still residing within the conductor shield and insulation jacket, as well as additional water from the cable's exterior, quickly diffuses back into the interstitial void volume when strand desiccation is suspended and flow of the organoalkoxysilane commences (see Bertini, "Molecular Thermodynamics of Water in Direct-buried Power Cables", *Electrical Insulation Magazine*, November/December 2006). Therefore, the catalyzed organoalkoxysilane composition is again exposed to water and viscosity quickly increases in a reinforcing cycle, resulting in the aforementioned flow problem (i.e., water enters void volume→more condensation of organoalkoxysilanes increases viscosity→reduced flow rate→even more water enters void volume, etc.).

Such a long injection time is necessitated when treating very long cable sections, such as submarine cables having a length greater than about 1,000 meters. Also, cables having significantly obstructed strand geometry relative to round strand design specifications often require excessive injection times. Examples of such obstructions of the cable's interior include conductor corrosion, strand compaction, and strand compression. Furthermore, the required injection time can also be excessive when the initial viscosity of the organoalkoxysilane is too high. Finally, if an obstructed or very long cable has to be injected at relatively low pressures, this step can also take too much time. For example, a cable having a relatively weak insulation jacket material, such as ethylene-propylene rubber (EPR), can be injected only at considerably lower pressures than those possible for polyethylene (PE) insulation. Similarly, a cable having a relatively thin insulation jacket might not be able to withstand the higher injection pressures. Of course, more than one of these cumulative factors can be associated with a given cable section, resulting in an even greater increase of the required injection time. Thus, many cables currently in service, whether due to excessive length, internal obstruction or materials of construction, cannot readily be rejuvenated by the aforementioned injection of a catalyzed organoalkoxysilane, and therefore have to be replaced when they fail.

SUMMARY OF THE INVENTION

A method for extending the useful life of at least one in-service electrical cable section having a stranded conductor surrounded by a conductor shield encased in a polymeric insulation jacket and having an interstitial void volume in the region of the conductor, the cable section having an average conductor temperature T, the method comprising:

(i) continuously introducing a non-condensing exclusion fluid into the interstitial volume, said exclusion fluid comprising at least one non-condensing exclusion component having a solubility in the insulation polymer at least 100 times the corresponding solubility of water, each solubility being determined at temperature T; and (ii) injecting a condensing dielectric enhancement fluid into the interstitial void volume, wherein said dielectric enhancement fluid has a virtual flow rate within said interstitial void volume of less than about 0.1 liter per hour.

BRIEF DESCRIPTION OF THE SEVERAL VIEWS OF THE DRAWING(S)

DETAILED DESCRIPTION OF THE INVENTION

Figure 1:
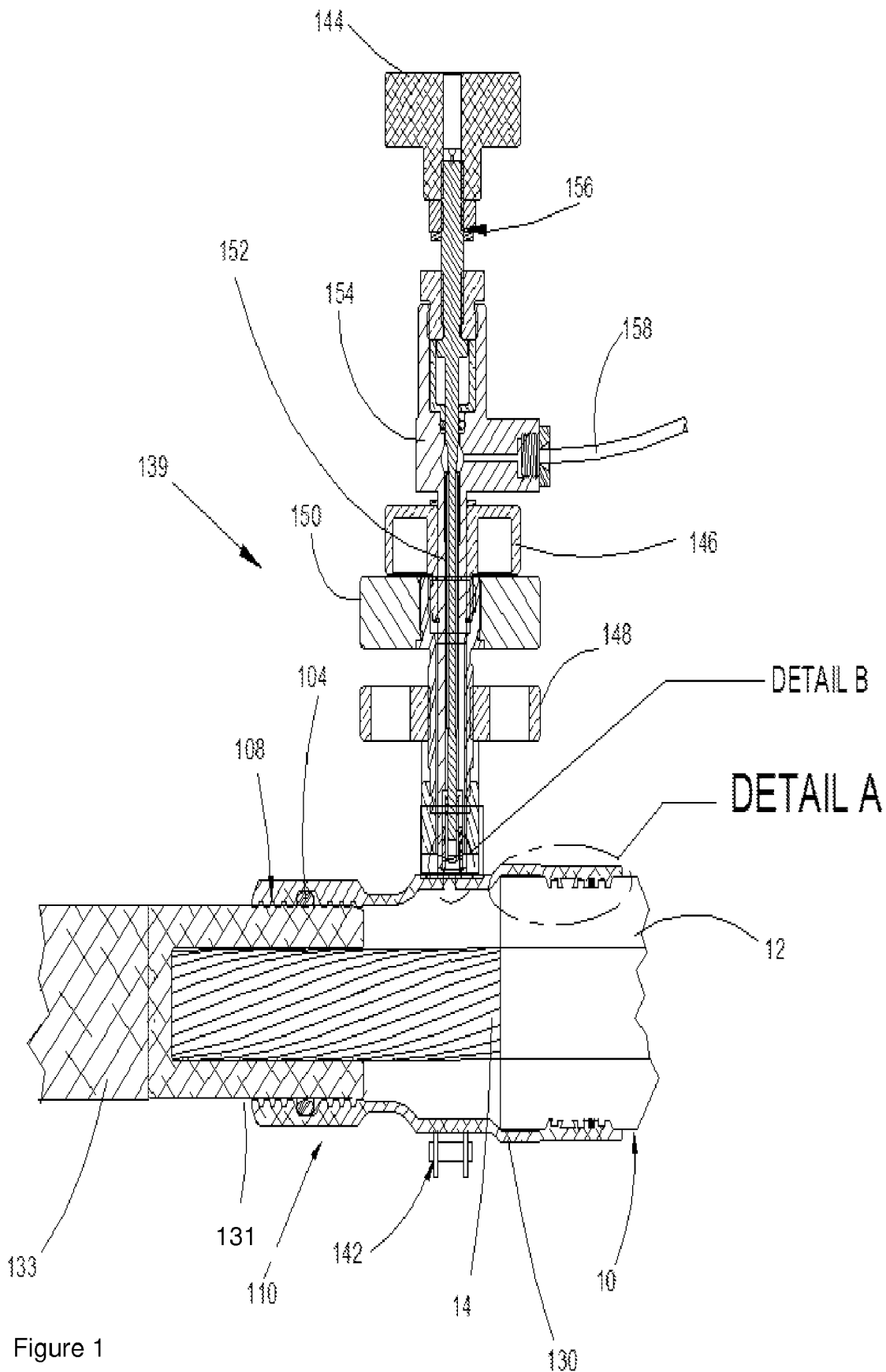
FIG. 1 is a partial cross-sectional view of an injection tool clamped in position over a swagable high-pressure terminal connector having a trapezoidal recessed groove.

According to the present method, the dielectric properties of an in-service electrical power cable section are enhanced by first continuously introducing a non-condensing exclusion fluid into the interstitial void volume of the cable section. In a second step, a condensing dielectric enhancement fluid is used to fill the interstitial void volume according to methods well known in the art. The instant method addresses the above discussed problems and is advantageously practiced when the cable section to be treated is very long, comprises a compacted conductor, or is otherwise significantly obstructed or when the intended dielectric enhancement fluid has a high initial viscosity. For many of these conditions, the virtual flow rate of the dielectric enhancement fluid can not exceed about 0.1 liter/hour due to various constraints dictated by cable's geometry and/or materials of construction. It has been found that in-service cable sections having such a limited virtual flow rate, further defined below, generally cannot be treated using current methods which employ condensing organoalkoxysilanes as the dielectric enhancement fluid since the viscosity of this fluid increases too much during the injection, as described above. Thus, for example, the instant method is well suited for treating cable sections greater than about 1,000 meters, and more preferably greater than about 2,000 meters or even greater than about 5,000 meters. Such cable lengths are often found in submarine installations. Likewise, the present method can be used to treat compacted or compressed cables or those comprising corroded conductors. The degree of strand compression of compaction can be estimated by physically examining the cable, as is well known in the art. Further, the extent of strand corrosion can be established by testing air flow, again using methods well known in the art. In general, it is contemplated that the present method is optimally applied when the time required to inject a condensing dielectric enhancement fluid according to the second step, described infra, is greater than about 15 days and is preferably greater than about 20 days.

As used herein, the term "in-service" refers to a cable section which has been under electrical load and exposed to the elements for an extended period. In such a cable, the electrical integrity of the cable insulation has generally deteriorated to some extent due to the above mentioned microscopic defects. Further, the term cable "segment," as used herein, refers to the section of cable between two terminal connectors, while a cable "sub-segment" is defined as a physical length of uninterrupted (i.e., uncut) cable extending between the two ends thereof. Thus, a cable segment is identical with a sub-segment when no splices are present between two connectors. Otherwise, a sub-segment can exist between a terminal connector and a splice connector or between two splice connectors, and a cable segment can comprise one or more sub-segments. The instant method applies equally to a segment and a sub-segment. For the sake of efficiency, the term "cable section" will be used herein to designate either a cable segment or a cable sub-segment, while the specific terms will be applied as appropriate.

For the purposes of the present method, the above mentioned virtual flow rate is defined as the calculated potential (expected) flow rate of an incompressible Newtonian liquid within the interstitial void volume of the cable section at steady state according to Poiseuille's law:

$$F = dV/dt = \pi R^4 (\Delta P)/8\eta L \quad (1)$$

where F is the virtual flow rate of a liquid flowing in volume V in time t, R is the effective hydraulic radius of the cable's interstitial void volume, $\Delta P$ is the pressure difference between the two ends of the cable section, $\eta$ is the dynamic viscosity of the liquid at the average conductor temperature T, and L is the total length of the cable section. For this calculation, it is assumed that the viscosity of the injected liquid is essentially constant during the entire injection. In equation (1), the effective hydraulic radius R is defined as $$R = 0.63 R_H + 0.37 R_C \quad (2)$$

where $R_H$ is the interstitial area of the conductor strands divided by the wetted perimeter of the strands, $R_C$ is the radius of a hypothetical circle with an area equal to the interstitial area. Calculation of the interstitial area is well known in the art (e.g., see U.S. Pat. No. 5,279,147). These values have been calculated for cables having various extents of compaction in common usage, the results being presented in Table 1, wherein N is the number of conductor strands, d is the strand diameter, D is the nominal conductor outer diameter, A is the interstitial area, p is the wetted perimeter, and the other symbols have been previously defined.

TABLE 1

| Cable | N | d (mils) | D (mils) | A (sq. in.) | p (in.) | $R_{H\,(in.)}$ | Rc (in.) | R (in.) |
|---|---|---|---|---|---|---|---|---|
| 2 concentric | 7 | 97 | 292 | 0.003 | 0.918 | 0.003 | 0.031 | 0.014 |
| 1 concentric | 19 | 66 | 332 | 0.012 | 2.503 | 0.005 | 0.062 | 0.026 |
| 1/0 concentric | 19 | 75 | 373 | 0.015 | 2.809 | 0.005 | 0.069 | 0.029 |
| 2/0 concentric | 19 | 84 | 418 | 0.019 | 3.155 | 0.006 | 0.077 | 0.032 |
| 3/0 concentric | 19 | 94 | 470 | 0.024 | 3.544 | 0.007 | 0.087 | 0.037 |
| 4/0 concentric | 19 | 106 | 528 | 0.030 | 3.977 | 0.008 | 0.098 | 0.041 |
| 250 concentric | 37 | 82 | 575 | 0.045 | 6.972 | 0.006 | 0.119 | 0.048 |
| 350 concentric | 37 | 97 | 681 | 0.063 | 8.253 | 0.008 | 0.141 | 0.057 |
| 500 concentric | 37 | 116 | 813 | 0.089 | 9.856 | 0.009 | 0.169 | 0.068 |
| 600 concentric | 61 | 99 | 893 | 0.119 | 14.959 | 0.008 | 0.195 | 0.077 |
| 700 concentric | 61 | 107 | 964 | 0.139 | 16.150 | 0.009 | 0.210 | 0.083 |
| 750 concentric | 61 | 111 | 998 | 0.149 | 16.723 | 0.009 | 0.217 | 0.086 |
| 800 concentric | 61 | 115 | 1031 | 0.159 | 17.266 | 0.009 | 0.225 | 0.089 |
| 900 concentric | 61 | 122 | 1094 | 0.179 | 18.322 | 0.010 | 0.238 | 0.094 |
| 1000 concentric | 61 | 128 | 1152 | 0.198 | 19.302 | 0.010 | 0.251 | 0.099 |
| 2 compressed | 7 | 97 | 283 | 0.001 | 0.918 | 0.002 | 0.022 | 0.009 |
| 1 compressed | 19 | 66 | 322 | 0.009 | 2.503 | 0.003 | 0.053 | 0.022 |
| 1/0 compressed | 19 | 75 | 362 | 0.011 | 2.809 | 0.004 | 0.060 | 0.025 |
| 2/0 compressed | 19 | 84 | 406 | 0.014 | 3.155 | 0.004 | 0.067 | 0.027 |
| 3/0 compressed | 19 | 94 | 456 | 0.018 | 3.544 | 0.005 | 0.075 | 0.031 |
| 4/0 compressed | 19 | 106 | 512 | 0.022 | 3.977 | 0.006 | 0.084 | 0.035 |
| 250 compressed | 37 | 82 | 558 | 0.034 | 6.972 | 0.005 | 0.103 | 0.041 |
| 350 compressed | 37 | 97 | 661 | 0.047 | 8.253 | 0.006 | 0.123 | 0.049 |
| 500 compressed | 37 | 116 | 789 | 0.067 | 9.856 | 0.007 | 0.146 | 0.058 |
| 600 compressed | 61 | 99 | 866 | 0.090 | 14.959 | 0.006 | 0.169 | 0.066 |

TABLE 1-continued

| Cable | N | d (mils) | D (mils) | A (sq. in.) | p (in.) | $R_{H\ (in.)}$ | Rc (in.) | R (in.) |
|---|---|---|---|---|---|---|---|---|
| 700 compressed | 61 | 107 | 935 | 0.105 | 16.150 | 0.007 | 0.183 | 0.072 |
| 750 compressed | 61 | 111 | 968 | 0.113 | 16.723 | 0.007 | 0.189 | 0.074 |
| 800 compressed | 61 | 115 | 1000 | 0.121 | 17.266 | 0.007 | 0.196 | 0.077 |
| 900 compressed | 61 | 122 | 1061 | 0.136 | 18.322 | 0.007 | 0.208 | 0.082 |
| 1000 compressed | 61 | 128 | 1117 | 0.150 | 19.302 | 0.008 | 0.218 | 0.086 |
| 2 compact | 7 | 97 | 268 | 0.001 | 0.918 | 0.001 | 0.015 | 0.006 |
| 1 compact | 19 | 66 | 299 | 0.002 | 2.503 | 0.001 | 0.024 | 0.009 |
| 1/0 compact | 19 | 75 | 336 | 0.002 | 2.809 | 0.001 | 0.028 | 0.011 |
| 2/0 compact | 19 | 84 | 376 | 0.003 | 3.155 | 0.001 | 0.029 | 0.011 |
| 3/0 compact | 19 | 94 | 423 | 0.004 | 3.544 | 0.001 | 0.033 | 0.013 |
| 4/0 compact | 19 | 106 | 475 | 0.005 | 3.977 | 0.001 | 0.038 | 0.015 |
| 250 compact | 37 | 82 | 520 | 0.010 | 6.972 | 0.001 | 0.057 | 0.022 |
| 350 compact | 37 | 97 | 616 | 0.015 | 8.253 | 0.002 | 0.069 | 0.027 |
| 500 compact | 37 | 116 | 736 | 0.021 | 9.856 | 0.002 | 0.083 | 0.032 |
| 600 compact | 61 | 99 | 813 | 0.036 | 14.959 | 0.002 | 0.107 | 0.041 |
| 700 compact | 61 | 107 | 877 | 0.041 | 16.150 | 0.003 | 0.114 | 0.044 |
| 750 compact | 61 | 111 | 908 | 0.044 | 16.723 | 0.003 | 0.118 | 0.045 |
| 800 compact | 61 | 115 | 938 | 0.047 | 17.266 | 0.003 | 0.122 | 0.047 |
| 900 compact | 61 | 122 | 999 | 0.057 | 18.322 | 0.003 | 0.135 | 0.052 |
| 1000 compact | 61 | 128 | 1060 | 0.074 | 19.302 | 0.004 | 0.153 | 0.059 |

In the first step of the instant method, an exclusion fluid is continuously introduced (injected) into the interstitial volume of a cable section. However, as used herein, it is contemplated that the term "continuously" encompasses the possibility of some degree of intermittent flow, including flow reversal(s), the latter being controlled by the applied pressure differential from the point of injection to the exit end of the cable section. For the purposes herein, the exclusion fluid is a non-condensing composition, or a single component, which does not crystallize at the lowest anticipated temperature of the cable conductor during its entire injection period and preferably has a viscosity no greater than about 20 cS, more preferably less than about 10 cS, and most preferably less than about 5 cS at the average temperature T of the cable's conductor during this step. This fluid should also be compatible with cable components (i.e., does not react adversely with aluminum, copper, shield polymer or insulation polymer). Preferably, it is non-toxic and is non-flammable. Further, the exclusion fluid comprises at least one non-condensing exclusion component having solubility in the polymeric insulation of the cable at least 100 times (100×) greater than the corresponding solubility of water, again at the average temperature T, during this first injection. If the cable is injected without being loaded, this temperature is essentially the surrounding water or soil temperature. If the cable is loaded, those skilled in the art will readily estimate this temperature knowing the amperage, soil temperature and soil conductivity (e.g., see United States Patent Application Publication No. 2007/0046668).

As used herein, the term "non-condensing" indicates that the exclusion fluid, whether a single component or a mixture of two or more components, is relatively non-reactive within the time scale and conditions of the above described injection step such that its viscosity does not increase by more than about 10% over a period of about 20 days and at the average temperature T, defined above, when this fluid is mixed with sufficient water to completely hydrolyze any water-reactive functionality which may be present therein. Preferably, such a viscosity increase does not occur over a period of one year or more. This is to be distinguished from the term "non-condensable," which refers to components that are essentially non-reactive (e.g., do not hydrolyze and then condense) under the above conditions. Accordingly, non-condensable components are by necessity also non-condensing, but not vice-versa.

Upon injection according to the first step of the present method, the exclusion fluid starts to fill the interstitial void volume of the cable as it proceeds along the length thereof. As flow of the exclusion fluid continues through the cable's interior, it drives any water residing therein out of the cable section, either by physical displacement or salvation and axial transport. Concurrently, the exclusion component contained in the exclusion fluid, further described infra, diffuses radially outward from the cable's interior into the conductor shield and then the insulation polymer. Thus, if the exclusion fluid contains two or more components, the concentration of the exclusion component in the exclusion fluid decreases along the cable length since it diffuses into the insulation polymer. Preferably, the diffusion coefficient of the exclusion component is $>10^{-8}$ cm$^2$/sec at T=50° C. such that it preferentially diffuses into the insulation jacket.

If flow of the exclusion fluid is allowed to continue for a sufficient time, the conductor shield and a portion of the insulation jacket adjacent to the conductor shield would become saturated with the exclusion component along the entire length of the cable section. While not wishing to be bound by any particular theory or mechanism, it is believed that the resulting reduced solubility of water in the polymer tends to exclude water from the polymer matrix and drive it radially outward from the cable due to a fugacity (chemical potential) gradient. It is further believed that this is in stark contrast to the previously described desiccation methods, wherein only the interstitial void volume is dried.

While it is preferred to continue the flow of the exclusion fluid until the concentration of the exclusion component reaches its maximum equilibrium profile (see United States Patent Application Publication No. 2007/0046668), from a practical perspective flow of the exclusion fluid according to the first step of the instant method need only be continued for a time sufficient to satisfy the following two conditions:

(1) Qout>0 and
(2) x/S is at least about 1, preferably at least 3 where Qout is the measured flow rate of the exclusion component exiting the interstitial volume of the cable section, x is the proportion of exclusion component in the exclusion fluid exiting the cable section and S is the solubility of the exclusion component in the insulation polymer at the average conductor temperature T, as defined above, x and S being expressed in like units (e.g., mass per unit volume). It is preferred that the flow of the exclusion fluid reaches a substantial steady state (e.g., (Qin-Qout) does not vary by more than about 10% over a 24 hour period), where Qin is the flow rate of the exclusion component into the cable section. It should be apparent that the values of Qin and Qout can be readily calculated since the total flow rates entering and exiting the cable section can be measured and the proportion of exclusion component in the exclusion fluid introduced is known while the value of x can be obtained by, e.g., chromatography or specific gravity testing. Similarly, S is a measured quantity obtained by noting the maximum amount of exudation component absorbed by the insulation polymer at temperature T. It will be recognized that, when the exclusion fluid is a single component, only the first of the above conditions need be satisfied (i.e., Qout>0). When the exclusion fluid contains component(s) in addition to the exclusion component, the second requirement recited above can be achieved by adjusting the concentration of the exclusion component in the exclusion fluid and/or by varying the flow rate of the exclusion fluid. Since the exclusion fluid injected in the first step (minus any part thereof that permeates into the conductor shield and insulation jacket) is displaced by the dielectric enhancement fluid during the second step of the present method, it is preferred that the above defined virtual flow rate of the exclusion fluid is no more than about 20% less than that of the dielectric enhancement fluid. More preferably, this virtual flow rate is about the same or greater than the virtual flow rate of the dielectric enhancement fluid. This assures that the exclusion fluid does not unduly delay the total injection period of the dielectric enhancement fluid and thereby unnecessarily expose the latter to water re-entry and condensation.

The Exclusion Fluid:

In general, the non-condensing exclusion component can be any organic material provided it meets the above solubility and cable compatibility specifications. Of course, when the exclusion fluid is a single component (i.e., the exclusion fluid is identical with the exclusion component), this component should also have a viscosity no greater than about 20 cS, preferably as low as possible, at the average temperature T.

Thus, for example, the exclusion component can be a hydrocarbon compound or substituted hydrocarbon compound, such as an aliphatic, olefinic or aromatic hydrocarbon compound, having 5 to about 20 carbon atoms. For example, hexane or octane could be used but a compound such as dodecane is preferred in view of its higher flash point (about 71° C.).

Organoalkoxysilanes having the above recited solubility characteristics in the cable insulation relative to water are also suitable non-condensing exclusion components which can be used alone or as ingredients of the above described exclusion fluid, provided that no condensation catalyst is included in the composition and the organoalkoxysilane is not autocatalytic with respect to hydrolysis and condensation (e.g., a cyano-functional alkoxysilane, as discussed below). Although it has been shown that such organoalkoxysilanes can hydrolyze in the presence of adventitious water, and subsequently condense to form oligomers or polymers of greater viscosity, this is typically a slow process in the absence of a catalyst (see U.S. Pat. No. 4,766,011 to Vincent et al.). Preferred uncatalyzed organoalkoxysilanes are diorganodimethoxysilanes containing aromatic groups, such as phenylmethyldimethoxysilane and tolylethylmethyldimethoxysilane. Despite the fugitive nature of such non-condensing (i.e., uncatalyzed) organoalkoxysilanes, many are well known dielectric enhancement materials and will provide a boost to the dielectric performance of the cable during the water exclusion step and supplement the effects of the second step of the present method, further described below.

Other silanes which are suitable exclusion components include non-reactive organosilanes such as tetramethylsilane, and ethyltrimethylsilane.

A preferred non-condensing exclusion component of the present method is acetophenone, this compound having the requisite solubility relative to water in the most frequently encountered insulation polymer, polyethylene, over likely cable conductor temperatures (15 to 90° C.). A plot of the logarithm of either the solubility of acetophenone, or that of water, is essentially linear with temperature over this range and approximate representative values are shown below for a polyethylene (PE) matrix.

| Compound | Solubility in PE at 15° C. (gm/cm³) | Solubility in PE at 90° C. (gm/cm³) |
|---|---|---|
| acetophenone | $9 \times 10^{-3}$ | $3 \times 10^{-1}$ |
| Water | $3 \times 10^{-5}$ | $4 \times 10^{-4}$ |

Although acetophenone has a melting point (19.5° C.), which is somewhat higher than the temperatures of many cables, particularly submarine cables in cool waters, this drawback can be overcome by adding a suitable melting point depressant or by electrically heating the cable. If added, such an adjuvant should be completely miscible with the acetophenone and preferably exhibits a high (>62° C.) flash point, a low viscosity (<10 cP), a low solubility in the conductor shield (<2% wt) and insulation (<1% wt) and have at least some miscibility with water. The latter property allows some water to dissolve in the flowing exclusion fluid and thus be transported axially to the exit end of the cable section, thus acting much like a liquid desiccant in a conventional process. Non-limiting examples of a suitable melting point depressant include propylene carbonate, n-methyl-2-pyrrolidone, and dipropylene glycol methyl ether acetate. A preferred exclusion fluid is a 1:1 (weight) mixture of acetophenone and propylene carbonate. In general, the melting point depressant can be a dielectric polar solvent, preferably miscible with acetophenone.

In one disclosed embodiment of the present method, the above mentioned composition consisting of a 1:1 weight mixture of acetophenone and propylene carbonate is injected into a polyethylene-insulated cable section according to the following protocol. After the usual cable preparation, time domain reflectometer (TDR) evaluation and gas flow testing, the latter also being employed to determine which end of the cable section presents the least resistance to flow, the above composition is injected by conventional means (e.g., a pressurized tank) to fill the interstitial void volume of the cable section and achieve a substantially stable feed rate and exit rate (i.e., no more than about a 10% flow variation of each over a 24 hour period). Flow is continued until all of the following conditions are attained:

(1) the weight percent of acetophenone in the effluent fluid is at least 10% by weight, indicating that there is sufficient acetophenone content in the exiting composition relative to its solubility in polyethylene;

(2) the concentration of acetophenone in the effluent fluid does not change by more than about 0.02% over a period which is the lesser of:

(i) the residence time of the fluid composition in the cable section, or (ii) Z from Table 2 below; indicating an approach to equilibrium; and (3) flow has continued for at least Z days, as determined by the average conductor temperature in Table 2, wherein Z is the number of days since the interstitial void volume was initially filled (i.e., fluid is first observed exiting the cable). This assures that there is an equilibrium distribution of acetophenone in the insulation.

TABLE 2

| Average Conductor Temperature (° C.) | Z (days) |
|---|---|
| T < 10 | 108 |
| 10 < T < 15 | 63 |
| 15 < T < 20 | 36 |
| 20 < T < 25 | 21 |
| 25 < T < 30 | 12 |
| 30 < T < 35 | 7 |
| T > 35 | 4 |

At this point, the flow of the exclusion fluid is terminated and the cable section is injected with a condensing dielectric enhancement fluid, as described infra. When the cable section being treated does not appreciably cycle with respect to conductor temperature (i.e., relatively steady electrical load), a similar embodiment to that described immediately above is preferred wherein the exclusion fluid is a 4:1 weight mixture of acetophenone:propylene carbonate.

In the second step of the present method, a condensing dielectric enhancement fluid is injected into the cable's interstitial void volume according to methods well known in the art. As used herein, the term "condensing" designates a composition comprising at least one water-reactive component which hydrolyzes when exposed to water and then condenses to form oligomeric species. For the purposes of the instant method, it is preferred that the water-reactive component in the dielectric enhancement fluid condense to at least form a dimer over a period of 20 days at the above described average conductor temperature T when sufficient water to react with all the hydrolysable functionality thereof is provided. More preferably, this component oligomerizes to the extent that its viscosity increases by more than about 10% under these conditions.

The Dielectric Enhancement Fluid:

The condensing dielectric enhancement fluid can comprise at least one organoalkoxysilane and a condensation catalyst therefor. Preferably, the organoalkoxysilane contains aromatic functionality and there are two alkoxy groups, preferably methoxy groups, per molecule thereof. Specific, non-limiting, examples of suitable organorganoalkoxysilanes include the following: phenylmethyldimethoxysilane; phenyltrimethoxysilane; diphenyldimethoxysilane; phenylmethyldiethoxysilane; N-methylaminopropylmethyldimethoxysilane; N-(3-methacryloxy-2-hydroxypropyl)-3-aminopropyltriethoxysilane; N-ethylaminoisobutyltrimethoxysilane; 3-(2,4-dinitrophenylamino)propyltriethoxysilane; N,N-dimethylaminopropyl)trimethoxysilane; (N,N-diethyl-3-aminopropyl)trimethoxysilane; N-butylaminopropyltrimethoxysilane; bis(2-hydroxyethyl)-3-aminopropyltriethoxysilane; 3-aminopropyltrimethoxysilane; 3-aminopropylmethyldiethoxysilane; p-aminophenyltrimethoxysilane; m-aminophenyltrimethoxysilane; 3-(m-aminophenoxy)propyltrimethoxysilane; N-(2-aminoethyl)-11-aminoundecyltrimethoxysilane; N-(6-aminohexyl)aminopropyltrimethoxysilane; N-(2-aminoethyl)-3-aminopropyltrimethoxysilane; N-(2-aminoethyl)-3-aminopropylmethyldimethoxysilane; N-(2-aminoethyl)-3-aminoisobutylmethyldimethoxysilane; 3-(N-allylamino)propyltrimethoxysilane; 2-(diphenylphosphino)ethyltriethoxysilane; n-decyltriethoxysilane; dodecylmethyldiethoxysilane; dodecyltriethoxysilane; hexadecyltrimethoxysilane; 1,7-octadienyltriethoxysilane; 7-octenyltrimethoxysilane; 2-(3-cyclohexenyl)ethyltrimethoxysilane; (3-cyclopentadienylpropyl)triethoxysilane; 21-docosenyltriethoxysilane(p-tolylethyl)methyldimethoxysilane; 4-methylphenethylmethyldimethoxysilane; divinyldimethoxysilane; o-methyl(phenylethyl)trimethoxysilane; styrylethyltrimethoxysilane; (chloro p-tolyl)trimethoxysilane; p-(methylphenethyl)methyldimethoxysilane; di(p-tolyl)dimethoxysilane; (p-chloromethyl)phenyltrimethoxysilane; chlorophenylmethyldimethoxysilane; chlorophenyltriethoxysilane; phenethyltrimethoxysilane; phenethylmethyldimethoxysilane; N-phenylaminopropyltrimethoxysilane; and (aminoethylaminomethyl)phenethyltriethoxysilane. Preferred organorganoalkoxysilanes include phenylmethyldimethoxysilane and (tolylethyl)methyldimethoxysilane. A preferred mixture of organoalkoxysilanes comprises either phenylmethyldimethoxysilane or phenyltrimethoxysilane in combination with either trimethylmethoxysilane or dimethyldimethoxysilane.

Alternatively, the condensing dielectric enhancement fluid can comprise at least one enoloxy-functional organosilane and a condensation catalyst therefor. Preferably, the enoloxy-functional organosilane contains aromatic functionality and there are two enoloxy groups per molecule thereof. Non-limiting examples of such enoloxy-functional organosilanes include methylphenyl bis(1-phenylethenyloxy)silane and methylvinyl bis(1-phenylethenyloxy)silane.

The catalysts contemplated herein for inclusion in the dielectric enhancement fluid comprising either an organoalkoxysilane or an enoloxy-functional organosilane are any of those known to promote the hydrolysis and condensation of these monomers, provided they do not adversely affect the cable components (e.g., they do not corrode copper or aluminum conductors). Typically, the catalyst is selected from organometallic compounds of tin, manganese, iron, cobalt, nickel, lead, titanium or zirconium. Examples of such catalysts include alkyl titanates, acyl titanates and the corresponding zirconates. Specific non-limiting examples of suitable catalysts include tetra-t-butyl titanate (TBT), dibutyltindiacetate (DBTDA), dibutyltindilaurate (DBTDL), dibutyltindioleate, tetraethylorthotitanate, tetraisopropyl titanate (TIPT), tetraoctadecylorthotitanate, dibutyltindioctoate, stannous octoate, dimethyltinneodeconoate, di-N-octyltin-S,S-isooctylmercaptoacetate, dibutyltin-S,S-dimethylmercaptoacetate, and diethyltin-S,S-dibutylmercaptoacetate. In general, such an organometallic catalyst is added at a level of about 0.05 to about 5% based on the total weight of the organoalkoxysilane components. More typically, it is supplied at a level of about 0.1 to about 2% or at a level of about 0.2 to about 1% by weight according to the above mentioned basis.

Alternatively, the catalyst is an acid having a pKa less than about 2.1 and is added in an effective amount for promoting the hydrolysis reaction of the organoalkoxysilane with water and subsequent condensation of the resulting product of hydrolysis. For the purposes herein, pKa has its usual definition of the negative logarithm (base 10) of the equilibrium constant (Ka) for the dissociation of the acid. Preferably, the acid to be used in the instant method has a pKa value between about −14 and about 0. The acid content should be kept as low as possible since it can contribute to the corrosion of the cable conductor, and this factor should be considered in the balance. Although it is recognized that the catalyst and the organoalkoxysilane interact on a molar basis, the catalyst should generally be added at a level of about 0.02 to about 1% based on the weight of the organoalkoxysilane component. More typically, it should be supplied at a level of from about 0.05 wt. % to about 0.6 wt. %, preferably from about 0.06 wt. % to about 0.5 wt. %. Preferably, the acid catalyst is selected from strong acids such as methanesulfonic acid, dodecylbenzenesulfonic acid, trifluoromethanesulfonic acid, benzenesulfonic acid, sulfuric acid, nitric acid, trifluoracetic acid, dichloroacetic acid and phosphoric acid. As noted above, it is recognized that a composition containing a strong acid, such as methanesulfonic acid, tends to corrode the typical aluminum conductor of the cable and it should, therefore, also incorporate a corrosion inhibitor. Compounds which act as suitable corrosion inhibitors in such an environment may be exemplified by acetophenone, acetone, Uvinul® 4050H product of BASF (CAS#124172-53-8), and Tinuvin® 123 product from Ciba® (CAS#: 129757-67-1). It is also contemplated herein that a combination of an organometallic catalyst and an acid catalyst can be employed in the dielectric enhancement fluid. It is preferred that an acid catalyst is employed when the dielectric enhancement fluid comprises an enoloxy-functional organosilane.

Further, the dielectric enhancement fluid can comprise a cyano-functional alkoxysilane such as 2-cyanobutylmethyldimethoxysilane, 3-cyano-butylmethyldimethoxysilane, and 3-cyanopropylmethyldimethoxysilane. Unlike the above discussed organoalkoxysilanes and enoloxy-functional organosilanes, the cyano-functional alkoxysilanes are typically autocatalytic with respect to condensation in the presence of water and therefore do not require the inclusion of a catalyst.

It is preferred that the dielectric enhancement fluid also contains either the same or a similar exclusion component as was used in the first step, thereby facilitating continuation of the exclusion effect during the second step of the present method. Thus, since the exclusion component is fugitive and exudes from the cable's insulation over time, a slow flow of the dielectric enhancement fluid according to the second step may further comprise a re-supply of the exclusion component to continue the exclusion function until the condensing dielectric enhancement fluid has traversed the entire cable length with little or no condensation within the interstitial void volume.

In order to obtain the maximum possible life extension of submarine cables, which are typically expensive to replace, it is often cost-effective to inject catalyzed organoalkoxysilanes which provide maximum life extension. In this case, a circuit owner can maximize the quantity of medium (Class M) and slowly diffusing (Class S) organoalkoxysilane components, these being described in detail in United States Patent Application Publication No. 2005/0189130, hereby incorporated by reference. In brief, these are defined as follows:

Class M is a dielectric enhancement component having a diffusion coefficient greater than about $10^{-8}$ cm$^2$/sec, but less than about $10^{-7}$ cm$^2$/sec at 50° C. in the insubtion polymer. Non-limiting examples include phenylmethyldimethoxysilane and tolylethylmethyldimethoxysilane.

Class S is a dielectric enhancement fluid having a solubility of about 0.0001 to about 0.02 gram/cm$^3$ at 25° C., or one having a diffusivity less than about $10^{-8}$ cm$^2$/sec at 50° C. and having a permeability less than about $10^{-10}$ g/cm·s at 25° C., each property being measured in the insulation material. Non-limiting examples include cyanobutylmethyldimethoxysilane, cyanoethylmethyldimethoxysilane and cyanopropylmethyldimethoxysilane. Examples of some preferred dielectric enhancement fluids for use in the second step of the present method are presented in Table 3, below.

TABLE 3

| Component | Formulation No./Component weight % | | | | | |
|---|---|---|---|---|---|---|
| | 1 | 2 | 3 | 4 | 5 | 6 |
| tolylethylmethyldimethyloxysilane | 62.000% | 60.000% | 52.000% | 43.000% | 35.000% | 26.000% |
| 2-cyanobutylmethyldimethoxysilane | 12.000% | 16.000% | 25.000% | 35.000% | 45.000% | 55.000% |
| ferrocene | 0.500% | 1.000% | 2.000% | 3.000% | 4.000% | 5.000% |
| acetophenone | 19.028% | 15.443% | 12.404% | 9.373% | 5.334% | 2.302% |
| propylene carbonate | 1.000% | 1.100% | 1.200% | 1.300% | 1.400% | 1.500% |
| Tinuvin ® 123 | 1.000% | 1.200% | 1.400% | 1.600% | 1.800% | 2.000% |
| Tinuvin ® 1130 | 1.000% | 1.200% | 1.400% | 1.600% | 1.800% | 2.000% |
| geranylacetone | 1.000% | 1.200% | 1.400% | 1.600% | 1.800% | 2.000% |
| Irgastab ® Cable KV10 | 2.000% | 2.400% | 2.800% | 3.200% | 3.600% | 4.000% |
| methanesulfonic acid | 0.081% | 0.078% | 0.068% | 0.056% | 0.046% | 0.034% |
| dodecylbenzenesulfonic acid | 0.391% | 0.379% | 0.328% | 0.271% | 0.221% | 0.164% |
| total | 100.000% | 100.000% | 100.000% | 100.000% | 100.000% | 100.000% |

All percentages are based on weight.
Tinuvin ® 123 = Product of Ciba ®, CAS # 129757-67-1;
Tinuvin ® 1130 = Product of Ciba ® CAS # 104810-47-1
Irgastab ® KV10 = Product of Ciba ®, CAS # 110553-27-0.
geranylacetone = 2,6-dimethyl-2,6-undecadien-10-one It is also contemplated that the amount of exclusion component (acetophenone in the example above) supplied in the second step may optionally be ramped or stepped down, approaching zero as the dielectric enhancement fluid progresses to the exit. Optionally, the dielectric enhancement fluid feed may continue from one or both cable ends in what is commonly called a "soak period" to provide even more of the above discussed medium-term or long-term components. After the desired amount of dielectric enhancement fluid is supplied, the terminal connectors at each end of the cable section are sealed, all injection equipment is removed, and the circuit is re-energized.

Each of the above described steps can be practiced at a relatively low injection pressure of about ≦50 pounds per square inch, gage (psig). However, it is preferred that either or both of the steps of the instant method are carried out at the highest pressure possible to expedite restoration of the cable section, provided that the materials of construction and any attached components can safely withstand the pressure. Moreover, the high pressure injection method allows more dielectric enhancement fluid to be injected into the cable and confined therein at a residual pressure, as taught in above cited United States Patent Application Publication No. 2005/0189130. This method was shown to be capable of injecting a cable having an insufficient interstitial void volume relative to the amount of dielectric enhancement fluid required to provide an optimum degree of treatment. As used herein, "high pressure" is defined as a pressure above about 50 psig, but less than that corresponding to the elastic limit of the cable's insulation. In order to facilitate rapid injection, the pressure is as high as possible consistent with the elastic limit constraint. For example, the pressure can be between about 100 and about 1000 psig, between about 100 and about 600 psig, between about 300 psig and about 1000 psig, or between about 300 psig and about 600 psig. The term "elastic limit" of the insulation jacket of a cable section is defined as the internal pressure in the interstitial void volume at which the outside diameter of the insulation jacket takes on a permanent set at 25° C. greater than 2% (i.e., the OD increases by a factor of 1.02 times its original value), excluding any expansion (swell) due to fluid dissolved in the cable components. This limit can, for example, be experimentally determined by pressurizing a sample of the cable section with a fluid having a solubility of less than 0.1% by weight in the conductor shield and in the insulation jacket (e.g., water), for a period of about 24 hours, after first removing any covering such as insulation shield and wire wrap. Twenty four hours after the pressure is released, the final OD is compared with the initial OD in making the above determination. Preferably, injection of fluid at high pressure is facilitated by the use of specially designed high-pressure connectors, as described in U.S. Pat. No. 7,195,504. Particularly preferred high-pressure terminal connectors and splices for use in the instant method are taught in United States Patent Application Publication No. 2007/0169954, hereby incorporated by reference, and further described below. Accordingly, if TDR testing indicates that the cable section contains one or more low pressure splices, these are first removed and replaced with the above mentioned high-pressure connectors.

The following description provides details of a typical high-pressure injection as applied to either the above described exclusion fluid or the dielectric enhancement fluid. This description is written for the case of a dielectric enhancement fluid, but it will be recognized that the exclusion fluid is not confined in the interstitial void volume of the cable section at a residual pressure after being injected at elevated pressure. The actual pressure used to fill the interstitial void volume is not critical provided the above-defined elastic limit is not attained. After the desired amount of the dielectric enhancement fluid has been introduced, the fluid is confined within the interstitial void volume at a sustained residual pressure greater than about 50 psig. It is preferred that the injection pressure is at least as high as the residual pressure to provide an efficient fill of the cable section (e.g., 550 psig injection and 500 psig residual). In another embodiment of this method, the residual pressure is sufficient to expand the interstitial void volume along the entire length of the cable section by at least 5%, again staying below the elastic limit of the polymeric insulation jacket. It is also contemplated that the dielectric enhancement fluid may be supplied at a pressure greater than about 50 psig for more than about 2 hours before being contained in the interstitial void volume. It is further preferred that the dielectric enhancement fluid is selected such that the residual pressure decays to essentially zero psig due to diffusion into the conductor shield and into the insulation jacket of the cable. This pressure decay generally occurs over a period of greater than about 2 hours, preferably in more than about 24 hours, and in most instances, within about two years of confining the fluid. It is to be understood that this pressure decay results from diffusion of the various components of the composition out of the interstitial volume and not by leaking past any connector.

Preferred Connectors For Use At High Pressures

A specific swagable high-pressure terminal connector of the type disclosed in United States Patent Application Publication No. 2007/0169954, and use thereof to inject fluid into a cable, is described as follows. As shown in FIG. 1, an insulation jacket 12 of a cable section 10 is received within a first end portion of a housing 130 of a connector 110. The first end portion of the housing 130 is sized such that its internal diameter (ID) is just slightly larger than the outer diameter (OD) of insulation jacket 12. As will be described in greater detail below, a swage is applied to the exterior of the first end portion of the housing 130 over an O-ring 134 which resides in an interior circumferentially-extending O-ring groove 135 in housing 130, multiple interior circumferentially-extending Acme thread-shaped grooves 138 in the housing, and an interior circumferentially-extending generally trapezoidal groove 136 in the housing. This insulation swaging region is shown in detail in the detail 2 of FIG. 1 and enlarged in FIG. 2.

Figure 2:
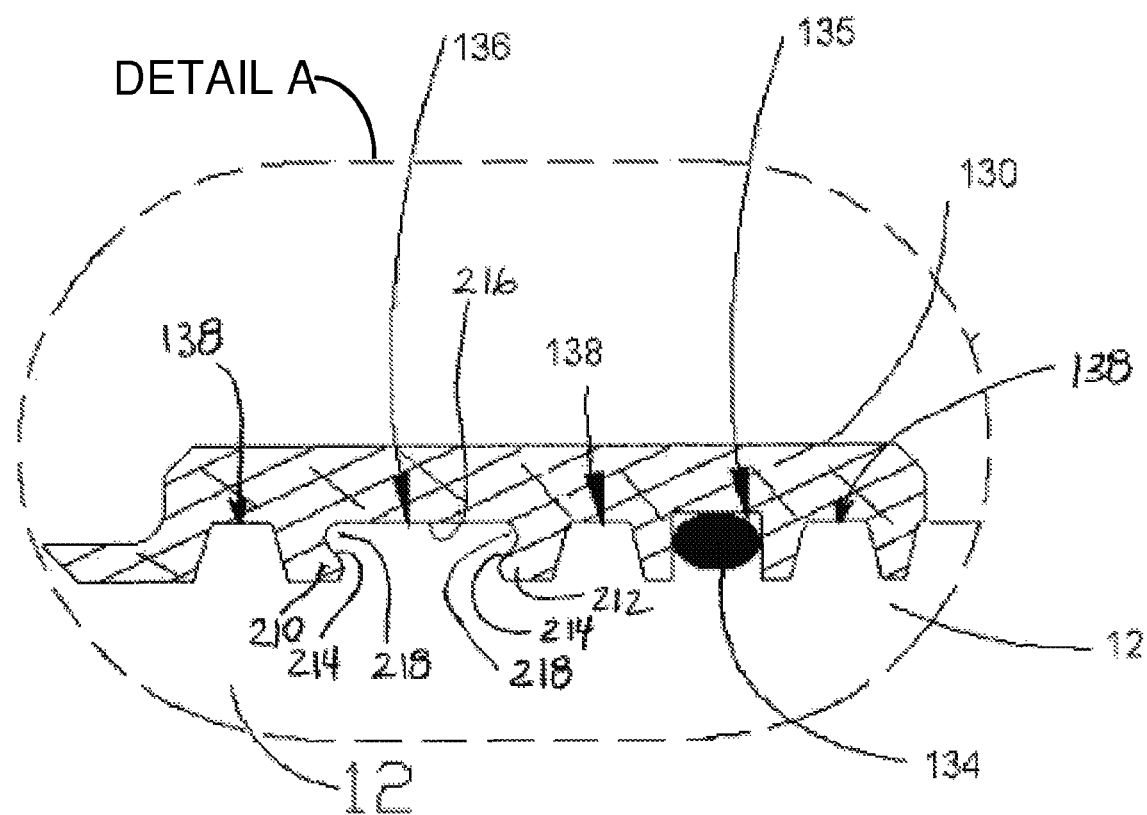
FIG. 2 is a cross-sectional view of detail area A of FIG. 1 showing the swaging region over the insulation jacket.

Referring to FIGS. 1 and 2, the trapezoidal groove 136 has a pair of oppositely-oriented, axially-projecting circumferentially-extending spurs 210 and 212. The spurs 210 and 212 are disposed essentially at an interior wall of the housing 130, and project in opposite axial directions and toward each other. The spurs 210 and 212 are provided by forming the circumferential groove 136 in the interior wall of the housing 130 at an axial position along the first end portion of the housing within the above described insulation swaging region over the insulation jacket (i.e., within the engagement portion of the housing). The circumferential groove 136 and the spurs 210 and 212, extend completely around the inner circumference of the inner wall of the housing 130. Each spur 21 0 and 212 has a generally radially outward facing wall 214 spaced radially inward from a radially inward facing recessed wall portion 216 of the housing 130 located within the groove. A pair of circumferentially-extending recesses 218 within the groove 136 are defined between the radially outward facing walls 214 of the spurs 210 and 212 and the radially inward facing recessed wall portion 216 of the housing 130. The recesses 218 form axially-opening undercut spaces located radially outward of the spurs within which a portion of the insulation jacket 12 of the cable section 10 is pressed and at least partially flows as a result of the swage applied to the exterior of the first end portion of the housing 130 in the insulation swaging region described above and the cable being placed in service. This operation forces at least some polymer of insulation jacket 12 into the groove 136 and further into the recesses 218 (i.e., into the undercuts). Essentially, the polymer of the insulation jacket 12 within the groove 136 and the groove itself form an interlocking joint, much like a dovetail mortise and tenon joint or union. As a result, a fluid-tight seal is formed between the insulation jacket 12 and the housing 130, which not only prevents pushback of the insulation jacket, but also provides leak-free operation when the cable section contains fluid at elevated pressure and is subjected to substantial thermal cycling that otherwise might cause relative radial movement and separation of the insulation jacket and the housing, and hence fluid leakage during the cooling phase of a thermal cycle. For the purposes herein, "substantial thermal cycling" refers to thermal cycling wherein the mode (i.e., peak) of the distribution with respect to time of ΔT, the difference between the high and low conductor temperatures, is at least about 20° C.

In the high-pressure connector shown in FIGS. 1 and 2, the insulation swaging region over the insulation jacket 12 (engagement portion of the housing 130) comprises at least one trapezoidal housing groove 136 as well as the O-ring 134, the latter residing in the separate O-ring groove 135. FIG. 1 shows a partial cross-sectional view of an injection tool 139 clamped in position over the swagable high-pressure terminal connector 110 just prior to injection of dielectric enhancement fluid into the cable section 10, as further described below. In a typical assembly procedure using this embodiment, the insulation jacket 12 of cable section 10 is first prepared for accepting a termination crimp connector 131 of the connector, as described in above cited U.S. Pat. No. 7,195,504. The housing 130 of the connector 110 includes an injection port 48 (see detail 3 of FIG. 1, and enlargement shown in FIG. 3). As described above, the housing 130 is sized such that its larger internal diameter (ID) at the first end portion of the housing is just slightly larger than the outer diameter (OD) of insulation jacket 12 and its smaller ID at an opposite second end portion is just slightly larger than the OD of the termination crimp connector 131. The housing 130 is slid over the conductor 14 of the cable section 10 and over the insulation jacket 12 of the cable section, and the termination crimp connector 131 is then slipped over the end of the conductor 14 and within the housing. The second end portion of the housing 130, having an O-ring 104 residing in a groove therein, is first swaged with respect to termination crimp connector 131. This first swage is applied over the O-ring 104 and the essentially square machined interior teeth 108 of the housing 130. Swaging can be performed in a single operation to produce swaging together of the conductor 14 and the termination crimp connector 131, and swaging together of the housing 130 and the termination crimp connector 131. Alternatively, swaging can be performed in phases (wherein the termination crimp connector 131 is swaged together with conductor 14 before the housing 130 is swaged together with the resulting termination crimp connector/conductor combination. This swaging operation joins the conductor 14, the termination crimp connector 131, and the housing 130 in intimate mechanical, thermal and electrical union and provides a redundant seal to the O-ring 104 to give a fluid-tight seal between the housing 130 and the termination crimp connector 131. It is also possible to perform the swaging operation over the insulation before swaging over the conductor, but the above sequence is preferred.

In FIG. 1, a copper termination lug 133 is spin welded to the aluminum termination crimp connector 131 to provide a typical electrical connection. The swaged assembly is then (optionally) twisted to straighten the lay of the outer strands of the conductor 14 to facilitate fluid flow into and out of the strand interstices. A second swage is then applied to the exterior of the first end portion of the housing 130 over the O-ring 134 (which resides in the separate interior groove 135 in the housing 130), the Acme thread-shaped grooves 138, and the trapezoidal groove 136 (i.e., over the insulation swaging region of detail 2 of FIG. 1 and enlarged in FIG. 2). O-rings 104 and 134 can be fabricated from a fluoroelastomer such as Viton®, ethylene-propylene rubber (EPR), or, preferably, ethylene-propylene diene monomer (EPDM) rubber while housing 130 is preferably made of stainless steel. This swaging operation forces at least some polymer of insulation jacket 12 into the trapezoidal groove 136 and the Acme thread grooves 138, while simultaneously deforming O-ring 134 to the approximate shape depicted in FIG. 2. As a result, a fluid-tight seal is formed between insulation jacket 12 and the first end portion of the housing 130, which seal prevents pushback of the insulation and provides leak-free operation when the cable section 10 contains fluid at elevated pressure and is subjected to substantial thermal cycling, as described above. At this point, the swaged connector 110, and cable section 10 to which it is attached, is ready to be injected with a dielectric enhancement fluid at an elevated pressure.

Figure 3:
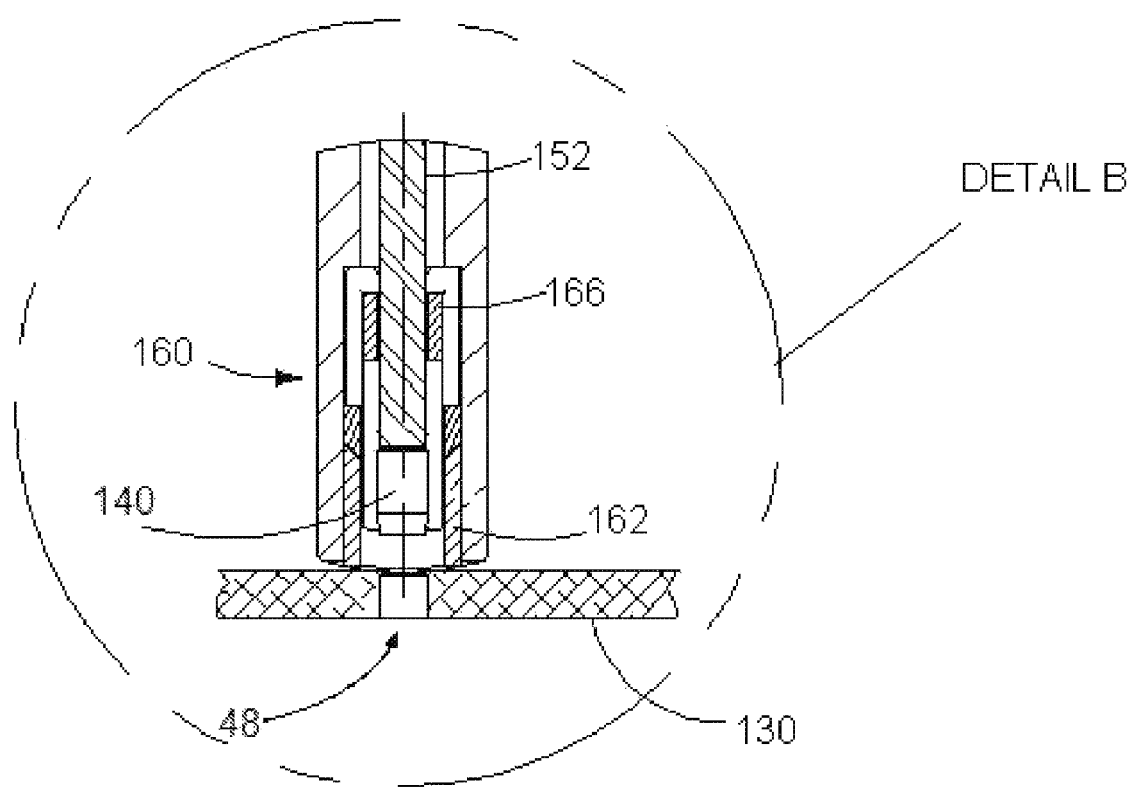
FIG. 3 is a cross-sectional view of detail area B of FIG. 1 showing the seal tube and injector tip.
Figure 4:
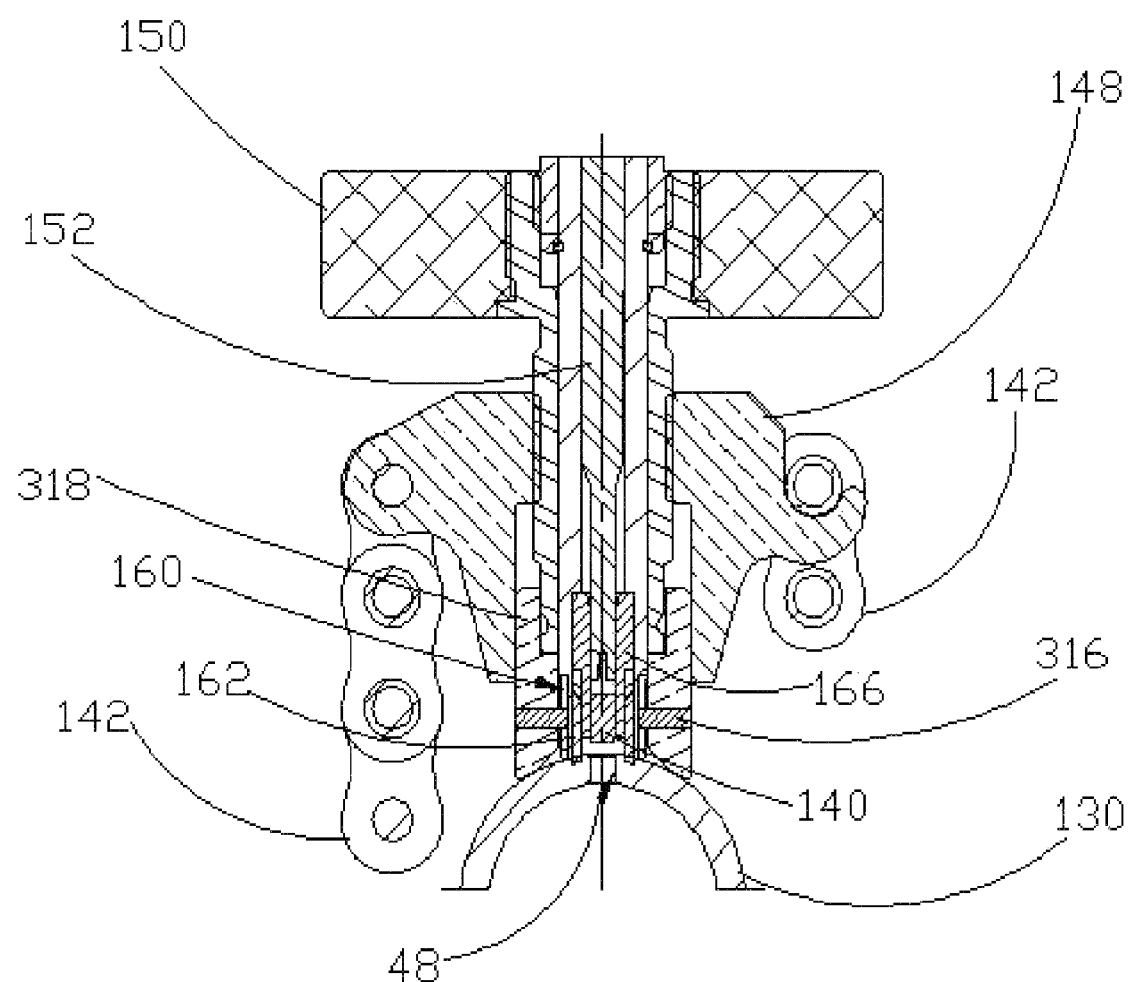
FIG. 4 is an enlarged cross-sectional view of the lower portion of the injection tool shown in FIG. 1 along the axial direction of the injection tool.
Figure 5:
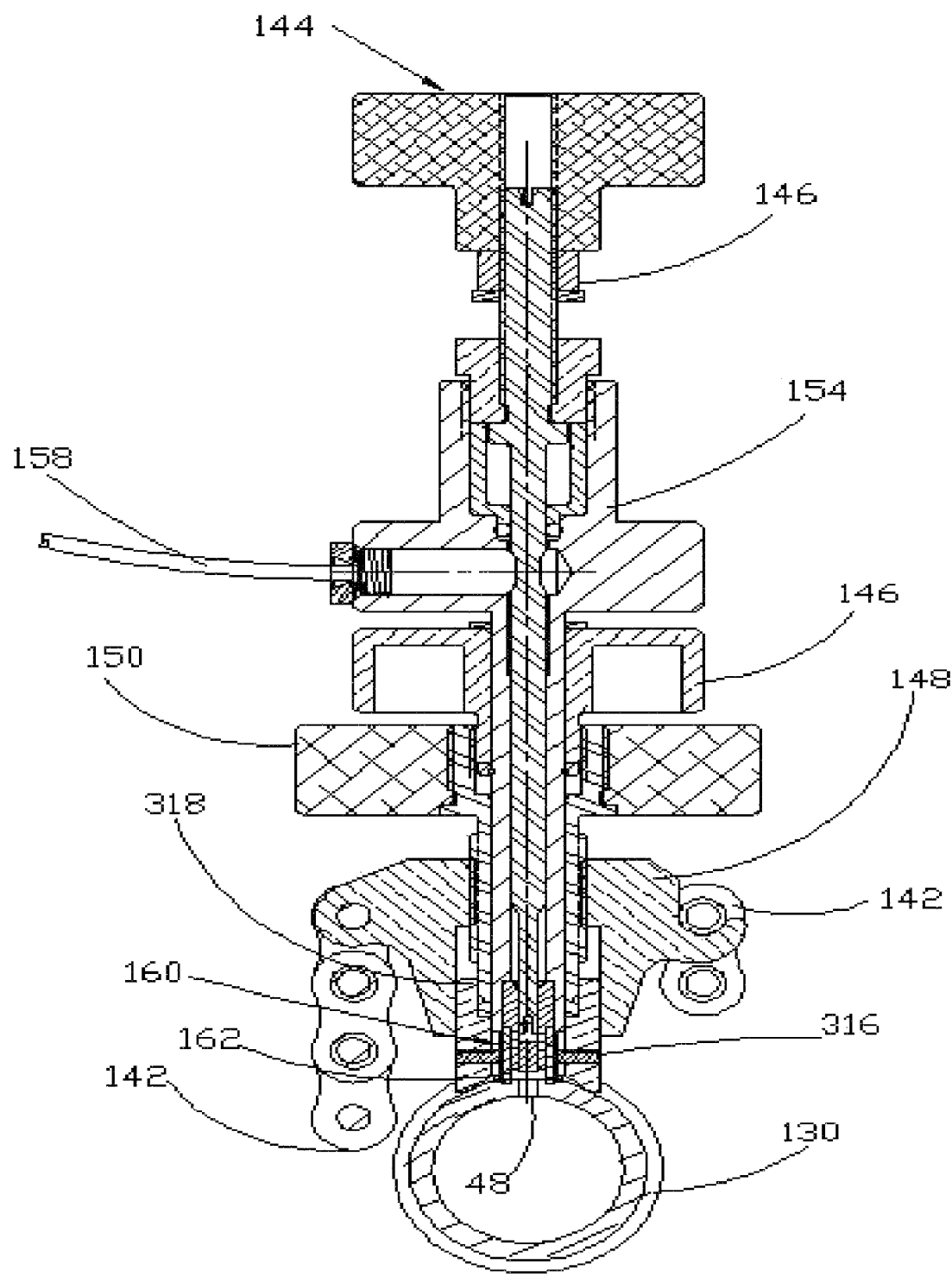
FIG. 5 is another enlarged cross-sectional view of the injection tool shown in FIG. 1 along the axial direction of the injection tool.

In a typical injection procedure, a plug pin 140, further described below, is loaded into a seal tube injector tip 160 of the injection tool 139 such that it is held in place by a spring collet 166, as shown in FIG. 3. Spring collet 166 comprises a partially cutout cylinder that has two 180° opposing "fingers" (not shown) which grip the plug pin 140 with sufficient force such that the latter is not dislodged by handling or fluid flow, but can be dislodged when the plug pin 140 is inserted into the injection port 48, as shown in detail in FIG. 3. The dielectric enhancement fluid to be injected, can flow between these "fingers" of spring collet 166. Referring to FIGS. 1 and 3, a yoke 148 is positioned over housing 130 and its center line is aligned with injection port 48 using a precision alignment pin (not shown), the latter being threaded into the yoke 148. The precision alignment pin brings the axis of a clamp knob 150 and the injection port 48 into precise alignment. A clamp chain 142, attached at a one side to the yoke 148, is wrapped around the housing 130 and then again attached to a hook 145 (see FIGS. 4 and 5) on the other side of the yoke 148. The now loosely attached chain is tightened by turning the clamp knob 150 (by means of threads-not shown). The precision alignment pin is unthreaded and removed from the yoke 148. The injection tool 139 is threaded into the yoke 148, and a seal knob 146 is then threaded into the clamp knob 150 to compress a polymeric seal 162 against the exterior of the housing 130, the entire injection tool 139 now being in precise alignment with injection port 48. At this point there is a fluid-tight seal between the seal tube injector tip 160 and the housing 130, thereby providing a flow path (for fluid) through the injection port 48 between the interior of the injection tool 139 and the interior of the housing 130, as shown in FIG. 3. For further clarity, FIGS. 4 and 5 provide enlarged cross-sectional views of at least a portion of the injection tool 139 in a direction along the axial direction of housing 130. These figures show a slide block 318 which presses against the housing 130 with a force equal to approximately twice the tension of chain 142. Guide pins 316 align with slots in the seal tube injector tip 160 and orient it with respect to housing 130 such that the axes of their respective curvatures are aligned, thus allowing a fluid-tight seal to be made.

Figure 6:
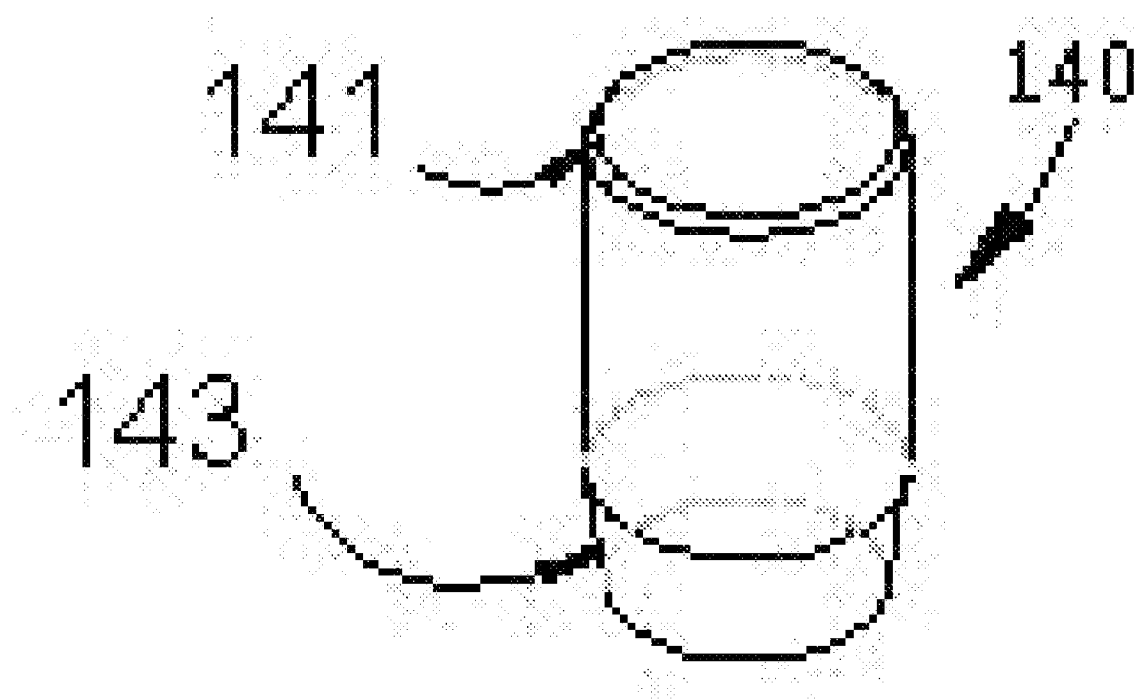
FIG. 6 is a perspective view of a plug pin used to seal the injection port of the connector shown in FIG. 1.

A pressurized dielectric enhancement fluid is then introduced to the interior of connector 110 and the interstitial void volume of cable section 10 via a tube 158, a seal tube inlet 154 and an annulus (not shown) formed between the seal tube injector tip 160 and the assembly of a press pin 152 and the plug pin 140. After the predetermined amount of fluid has been introduced (or a predetermined uniform pressure along the full length of the cable section has been attained, as described in detail in above cited Publication No. 2005/0189130), a press pin actuator knob 144 is tightened (utilizing mated threads in the injection tool 139—not shown) so as to advance press pin 152 toward injection port 48, thereby pushing plug pin 140 into injection port 48 such that the nominally circular end surface of plug pin 140, located adjacent to a first chamfered end 141 of the plug pin, is essentially flush with the exterior surface of the housing 130. The first chamfered end 141 of the plug pin 140, illustrated in perspective view in FIG. 6, assures a post injection "no snag" exterior surface for the finished assembly of housing 130. The plug pin 140 has as a diameter slightly larger than the diameter of injection port 48 to provide a force fit therein. Finally, plug pin 140 also has a second chamfered end 143 to allow self-guidance into injection port 48 and to allow the force fit with injection port 48 to create a fluid-tight seal. Plug pin 140 can subsequently be pushed into the interior of the connector 110 in the event that additional fluid is to be injected or the system needs to be bled for any reason, and later a slightly larger plug pin can be re-inserted. At this point, the pressurized fluid supply is discontinued and injection tool 139 is disconnected from connector 110 to complete the injection process.

Implicit in the above description of the injection step is the presence of a similar splice (or terminal) high-pressure connector at the other end of the cable section being injected at elevated pressure. Thus, when the interstitial void volume of the section is completely filled, and preferably partially bled at the end opposite from the injection end of the cable section, the dielectric enhancement fluid is confined within the interstitial void volume of the section as well as within the high-pressure connectors. It is contemplated herein that the dielectric enhancement fluid may be supplied at a pressure greater than about 50 psig for more than about 2 hours before being confined within the interstitial void volume. Those skilled in the art will also readily appreciate that, while the description of the above embodiment illustrates injection through a terminal high-pressure connector, the cable section 10 can be a cable segment or a cable sub-segment, as defined above. Thus, for example, it is contemplated herein that the cable section could comprise at least one high-pressure splice comprising two connectors which are swaged to opposite ends of a splice strand connector, as illustrated by the (similar) dual housing high-pressure splice connector shown in FIG. 8 of above cited U.S. Pat. No. 7,195,504.

When the insulation jacket polymer is considerably weaker than polyethylene, as is the case for EPR, or when existing low pressure splices cannot easily be replaced, the pressures used to inject the exclusion fluid, as well as the dielectric enhancement fluid, described below, have to be scaled to appropriate levels (e.g. $\leq$50 psig) or a higher concentration of acetophenone is used.

Thus, for example, although it was possible to inject an almost 6 km long 1/0 submarine cable with a catalyzed organoalkoxysilane composition at about 300-400 psig over a period of about 9-11 days (Transmission & Distribution World, Jul. 1, 1999, "Submarine Cable Rescued With Silicone-Based Fluid."), this could not have been accomplished had the insulation of the cable been fabricated from EPR since a more appropriate injection pressure of about 50 psig would have reduced the flow rate, and correspondingly increased the time of injection, by approximately five-fold. It is unlikely that the entire cable section could have been filled at this lower pressure due to the above discussed ever increasing viscosity resulting from hydrolysis and condensation of the catalyzed organoalkoxysilane upon continued diffusion of water into the interstitial void volume. The calculated virtual flow rate of the dielectric enhancement fluid in this case was about 0.14 L/hr.

Contrarily, a 3-phase, 15 kV, EPR-insulated 4/0 submarine cable having a length of about 12,300 feet (3.75 km) was injected with the above described exclusion fluid composition consisting of a 1:1 weight blend of acetophenone and propylene carbonate at a pressure differential of about 62 psig (about 50 psig of pressure and about 12 psig of vacuum) for a period of about 65 days at a conductor temperature of about 10° C. Subsequently, this cable section was injected with a catalyzed dielectric enhancement fluid (formulation 3 from Table 3, above) for a period of about 56 days, thereby completely filling the interstitial void volume of this cable section according to the instant method without difficulty. The calculated virtual flow rate of the dielectric enhancement fluid in this case was about 0.06 L/hr.

As is common practice in the art, either or both of the above described steps can be performed on either an energized or a de-energized cable section. Generally, the cable is energized during each injection but must, of course, be de-energized to install suitable injection connectors prior to the exclusion step and then to remove these at the conclusion of the second step.

That which is claimed is:

1. A method for extending the useful life of at least one in-service electrical cable section having a stranded conductor surrounded by a conductor shield encased in a polymeric insulation jacket and having an interstitial void volume in the region of the conductor, the cable section having an average conductor temperature T, the method comprising:
   (i) continuously introducing a non-condensing exclusion fluid into the interstitial volume, said exclusion fluid comprising at least one non-condensing exclusion component having a solubility in the insulation polymer at least 100 times the corresponding solubility of water, each solubility being determined at temperature T; and
   (ii) injecting a condensing dielectric enhancement fluid into the interstitial void volume to displace the exclusion fluis previously introduced, wherein said dielectric enhancement fluid has a virtual flow rate within said interstitial void volume of less than about 0.1 liter per hour.

2. The method of claim 1, wherein said cable section has a length greater than about 1,000 meters.

3. The method of claim 2, wherein said cable section is a submarine cable.

4. The method of claim 1, wherein said non-condensing exclusion fluid comprises acetophenone.

5. The method of claim 4, wherein said non-condensing exclusion fluid further comprises a melting point depressant selected from propylene carbonate, n-methyl-2-pyrrolidone, or dipropylene glycol methyl ether acetate.

6. The method of claim 5, wherein said non-condensing exclusion fluid comprises acetophenone and propylene carbonate in a respective weight ratio ranging from about 1:1 to about 4:1.

7. The method of claim 1, wherein said non-condensing exclusion fluid comprises an uncatalyzed organoalkoxysilane.

8. The method of claim 1, wherein said non-condensing exclusion fluid comprises a hydrocarbon compound having 5 to about 20 carbon atoms.

9. The method of claim 1, wherein said condensing dielectric enhancement fluid comprises an organoalkoxysilane and a condensation catalyst therefor.

10. The method of claim 9, wherein said organoalkoxysilane is selected from phenylmethyldimethoxysilane, (tolylethyl)methyldimethoxysilane, or phenylmethyldimethoxysilane, and said catalyst is an acid catalyst selected from methanesulfonic acid, trifluoromethanesulfonic, or benzenesulfonic acid.

11. The method of claim 1, wherein said condensing dielectric enhancement fluid comprises an enoloxy-functional organosilane and a condensation catalyst therefor.

12. The method of claim 11, wherein said enoloxy-functional organosilane is selected from methylphenyl bis(1-phenylethenyloxy)silane or methylvinyl bis(1-phenylethenyloxy)silane.

13. The method of claim 1, wherein said condensing dielectric enhancement fluid comprises a cyano-functional alkoxysilane.

14. The method of claim 13, wherein said cyano-functional alkoxysilane is selected from 2-cyanobutylmethyldimethoxysilane, 3-cyano-butylmethyldimethoxysilane, or 3-cyanopropylmethyldimethoxysilane.

15. A method for enhancing the dielectric properties of at least one electrical cable section having a central stranded conductor encased in a polymeric insulation jacket and having an interstitial void volume in the region of the conductor, the cable section having an average conductor temperature T, the method comprising:
   (i) continuously introducing a non-condensing exclusion fluid into the interstitial volume, said exclusion fluid comprising at least one non-condensing exclusion component having a solubility in the insulation polymer at least 100 times the corresponding solubility of water, each solubility being determined at temperature T;
   (ii) filling the interstitial void volume with at least one condensing dielectric enhancement fluid at a pressure below the elastic limit of the polymeric insulation jacket to displace the exclusion fluis previously introduced; and
   (iii) confining the condensing dielectric enhancement fluid within the interstitial void volume at a residual pressure greater than about 50 psig, the pressure being imposed along the entire length of the cable section and being below said elastic limit, wherein said condensing dielectric enhancement fluid has a virtual flow rate within said interstitial void volume of less than about 0.1 liter per hour.

16. The method of claim 15, wherein the residual pressure is between about 100 psig and about 1000 psig.

17. The method of claim 15, wherein the dielectric enhancement fluid is supplied at a pressure greater than about 50 psig for more than about 2 hours before being confined in the interstitial void volume.

18. The method of claim 15, wherein the residual pressure decays to essentially zero psig in a period greater than about 2 hours.

19. The method of claim 15, wherein said cable section has a length greater than about 1,000 meters.

20. The method of claim 19, wherein said cable section is a submarine cable.

21. The method of claim 15, wherein said non-condensing exclusion fluid comprises acetophenone.

22. The method of claim 21, wherein said non-condensing exclusion fluid further comprises a melting point depressant selected from propylene carbonate, n-methyl-2-pyrrolidone, or dipropylene glycol methyl ether acetate.

23. The method of claim 22, wherein said non-condensing exclusion fluid comprises acetophenone and propylene carbonate in a respective weight ratio ranging from about 1:1 to about 4:1.

24. The method of claim 15, wherein said non-condensing exclusion fluid comprises an uncatalyzed organoalkoxysilane.

25. The method of claim 15, wherein said wherein said non-condensing exclusion fluid comprises a hydrocarbon compound having 5 to about 20 carbon atoms.

26. The method of claim 15, wherein said condensing dielectric enhancement fluid comprises an organoalkoxysilane and a condensation catalyst therefor.

27. The method of claim 26, wherein said organoalkoxysilane is selected from phenylmethyldimethoxysilane, (tolylethyl)methyldimethoxysilane, or phenylmethyldimethoxysilane, and said catalyst is an acid catalyst selected from methanesulfonic acid, trifluoromethanesulfonic, or benzenesulfonic acid.

28. The method of claim 15, wherein said condensing dielectric enhancement fluid comprises an enoloxy-functional organosilane and a condensation catalyst therefor.

29. The method of claim 28, wherein said enoloxy-functional organosilane is selected from methylphenyl bis(1-phenylethenyloxy)silane or methylvinyl bis(1-phenylethenyloxy)silane.

30. The method of claim 15, wherein said condensing dielectric enhancement fluid comprises a cyano-functional alkoxysilane.

31. The method of claim 30, wherein said cyano-functional alkoxysilane is selected from 2-cyanobutylmethyldimethoxysilane, 3-cyano-butylmethyldimethoxysilane, or 3-cyanopropylmethyldimethoxysilane.

* * * * *

UNITED STATES PATENT AND TRADEMARK OFFICE
CERTIFICATE OF CORRECTION

| | | |
|---|---|---|
| PATENT NO. | : 7,976,747 B2 | Page 1 of 1 |
| APPLICATION NO. | : 12/257993 | |
| DATED | : July 12, 2011 | |
| INVENTOR(S) | : Glen J. Bertini | |

It is certified that error appears in the above-identified patent and that said Letters Patent is hereby corrected as shown below:

Col. 18, Claim 1, line 28 should read: fluid previously introduced, wherein said dielectric
Col. 19, Claim 15, line 23 should read: to displace the exclusion fluid previously introduced;

Signed and Sealed this
Fifth Day of February, 2013

Teresa Stanek Rea
*Acting Director of the United States Patent and Trademark Office*